United States Patent [19]
Riemersma et al.

[11] Patent Number: 5,488,882
[45] Date of Patent: Feb. 6, 1996

[54] TILTER CATCH MECHANISM

[75] Inventors: Keith A. Riemersma; Ronald Dalman; Calvin Overway; Robert Piccione; Dennis M. Sica, all of Holland; Terrence L. Tromp, Jenison, all of Mich.

[73] Assignee: National Bulk Equipment, Inc., Holland, Mich.

[21] Appl. No.: 308,096

[22] Filed: Sep. 16, 1994

[51] Int. Cl.⁶ ........................................... B65G 65/23
[52] U.S. Cl. ...................... 74/577 S; 74/575; 414/419
[58] Field of Search ........................ 74/575, 577 R, 74/577 S; 414/419, 421

[56] References Cited

U.S. PATENT DOCUMENTS

| | | | |
|---|---|---|---|
| 2,578,116 | 12/1951 | White et al. | 214/1.1 |
| 3,198,395 | 8/1965 | McKinney | 222/166 |
| 4,278,386 | 7/1981 | Eranosian | 414/421 |
| 4,449,880 | 5/1984 | Hartman | 414/421 |

FOREIGN PATENT DOCUMENTS

| | | | |
|---|---|---|---|
| 1024416 | 6/1983 | U.S.S.R. | 414/419 |
| 1514686 | 10/1989 | U.S.S.R. | 414/419 |
| 1641760 | 4/1991 | U.S.S.R. | 414/419 |

Primary Examiner—Charles A. Marmor
Assistant Examiner—Mary Ann Battista
Attorney, Agent, or Firm—Flynn, Thiel, Boutell & Tanis

[57] ABSTRACT

A tilter catch mechanism for a tipping device. The tipping device has a frame and a flat tiltable platform tiltably supported on the frame and for movement between a first horizontally aligned position and a second position inclined to the horizontal. An inflatable bladder device is provided for effecting a driving tilting movement of the platform between the first and second positions. The tilter catch mechanism includes a ratchet gearing device interposed between the frame and the tiltable platform, the ratchet gearing device including a toothed ratchet gear attached to either the frame or the tiltable platform and a pivotal pawl pivotally supported on the other one of the frame or tiltable platform. A spring continually urges the pawl toward the teeth on the ratchet gear. A pneumatic control is provided for controlling a flow of pressurized gas from a pressurized gas supply to and from the bladder to cause the tiltable table to be moved between the first and second positions. The pneumatic control also causes, when the tiltable table is to be moved from a tilted position back toward the horizontal, a disengagement of the pawl from the teeth on the toothed ratchet gear to thereby allow the tilted platform to be lowered to the horizontally aligned position.

6 Claims, 4 Drawing Sheets

TILTER CATCH MECHANISM

FIELD OF THE INVENTION

This invention relates to a tilter catch mechanism for a tipping device, the tipping device having a frame, a flat tiltable platform tiltably supported on the frame between a first horizontally aligned position and a second position inclined to the horizontal with a pneumatic driven device being provided for effecting a driving tilting movement of the platform between the first and second positions.

BACKGROUND OF THE INVENTION

Tilting devices have been known for a long time and U.S. Pat. Nos. 2,578,116 and 3,198,395 are mere representative examples thereof. These tilting devices even include some form of a device for locking the tiltable platform in a tilted position (see FIG. 7 of the aforesaid U.S. Pat. No. 2,578,116). U.S. Pat. No. 3,198,395 uses hydraulic circuitry which locks the tiltable platform in a tilted position due to the non-compressibility of the hydraulic fluid.

In pneumatic circuits, however, there is a problem in that if there should be a failure of the air supply, a tilted platform could suddenly be without sufficient pneumatic pressure to maintain the tiltable platform in its tilted position. With a heavy weight on the tiltable platform, there is a possibility that the tiltable platform could suddenly lurch back toward a generally horizontally aligned position possibly resulting in a pitching of the load on the tiltable platform on to the floor and possibly on to personnel located immediately adjacent thereto.

Accordingly, it is an object of this invention to provide a tilter catch mechanism for a tipping device capable of catching a tilted platform and preventing it from tilting back toward its horizontally aligned position upon the failure of a pneumatic pressure supply.

It is a further object of the invention to provide a tilter catch mechanism which is in the form of a retrofit kit capable of being retrofitted on to existing tipping devices already in operation.

It is a further object of the invention to provide a tilter catch mechanism, as aforesaid, wherein a toothed ratchet gear and a pivotal pawl are used in combination with each other, one being fastened to a frame supporting the tiltable platform and the other being supported on the tiltable platform.

It is a further object of the invention to provide a tilter catch mechanism, as aforesaid, which is durable and is easy to install and maintain.

SUMMARY OF THE INVENTION

The objects and purposes of the invention are met by providing a tilter catch mechanism for a tipping device, the tipping device having a frame, a flat tiltable platform tiltably supported on the frame and for movement between a first horizontally aligned position and a second position inclined to the horizontal. A pneumatic driven device is provided for effecting a driving tilting movement of the platform between the first and second positions. The tilter catch mechanism includes a ratchet gearing device interposed between the frame and the tiltable platform, the ratchet gearing device including a toothed ratchet gear attached to either the frame or the tiltable platform and a pivotal pawl pivotally supported on the other one of the frame or tiltable platform. The pawl is pivotal between a first position engaging a tooth on the toothed ratchet gear and a second position spaced from the toothed ratchet gear and teeth. A spring continually urges the pawl to the first position. A pneumatic control is provided for controlling a flow of pressurized gas from a pressurized gas supply to and from the pneumatic driven device to cause the tiltable table to be moved between the first and second positions. The pneumatic control also causes, when the tiltable table is to be moved from a tilted position back toward the horizontal, a disengagement of the pawl from the teeth on the toothed ratchet gear.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
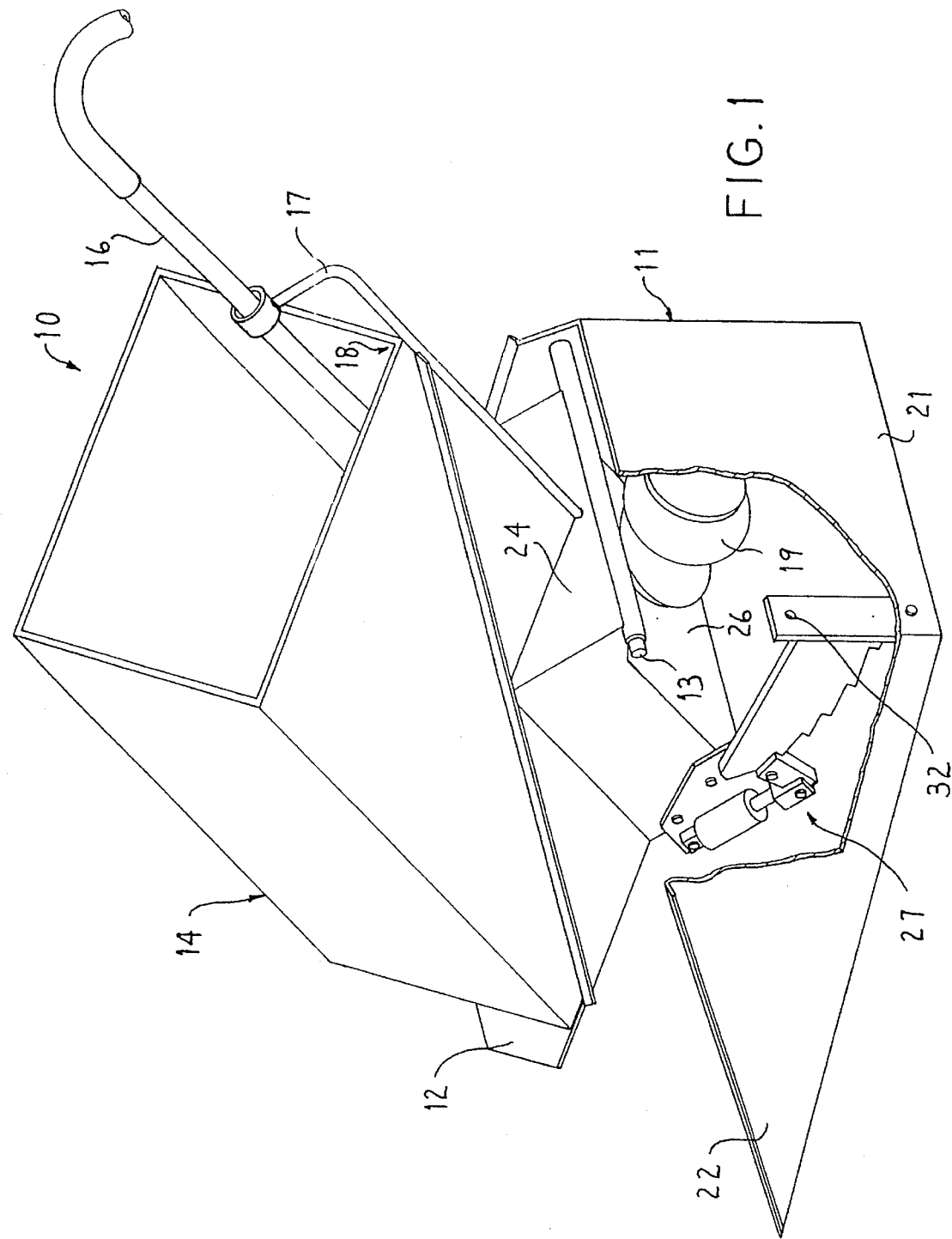
FIG. 1 is an isometric view illustrating a tipping device having a tilter catch mechanism embodying the invention.

A conventional tipping device 10 is illustrated in FIG. 1 and includes a frame 11 on which is pivotally supported a tiltable platform 12 pivotal about an axle 13 secured to the frame 11. In this particular embodiment, a large cardboard box 14, also known as a "gaylord" is supported on the tiltable platform 12. The cardboard container 14 is generally filled with a granulated material, such as plastic synthetic resin pellets (plastic pellets) which are sucked out of the container through a wand 16 and delivered to an injection molding machine (not illustrated). The wand 16 is held in position in one corner of the cardboard container by a wand bracket 17. The tipping device 10 is adapted to tip the cardboard container 14 from a generally upright position to the position illustrated so that the plastic pellets will move downwardly toward a lowermost corner 18 of the container and so that the wand, oriented in the corner 18, can eventually, as is conventional, suck up therethrough all of the plastic pellets in the container and cause them to be delivered to a hopper serving the injection molding machine. Another type of tiltable platform is illustrated in U.S. Pat. No. 4,449,880, assigned to the same assignee as is the present invention.

Figure 2:
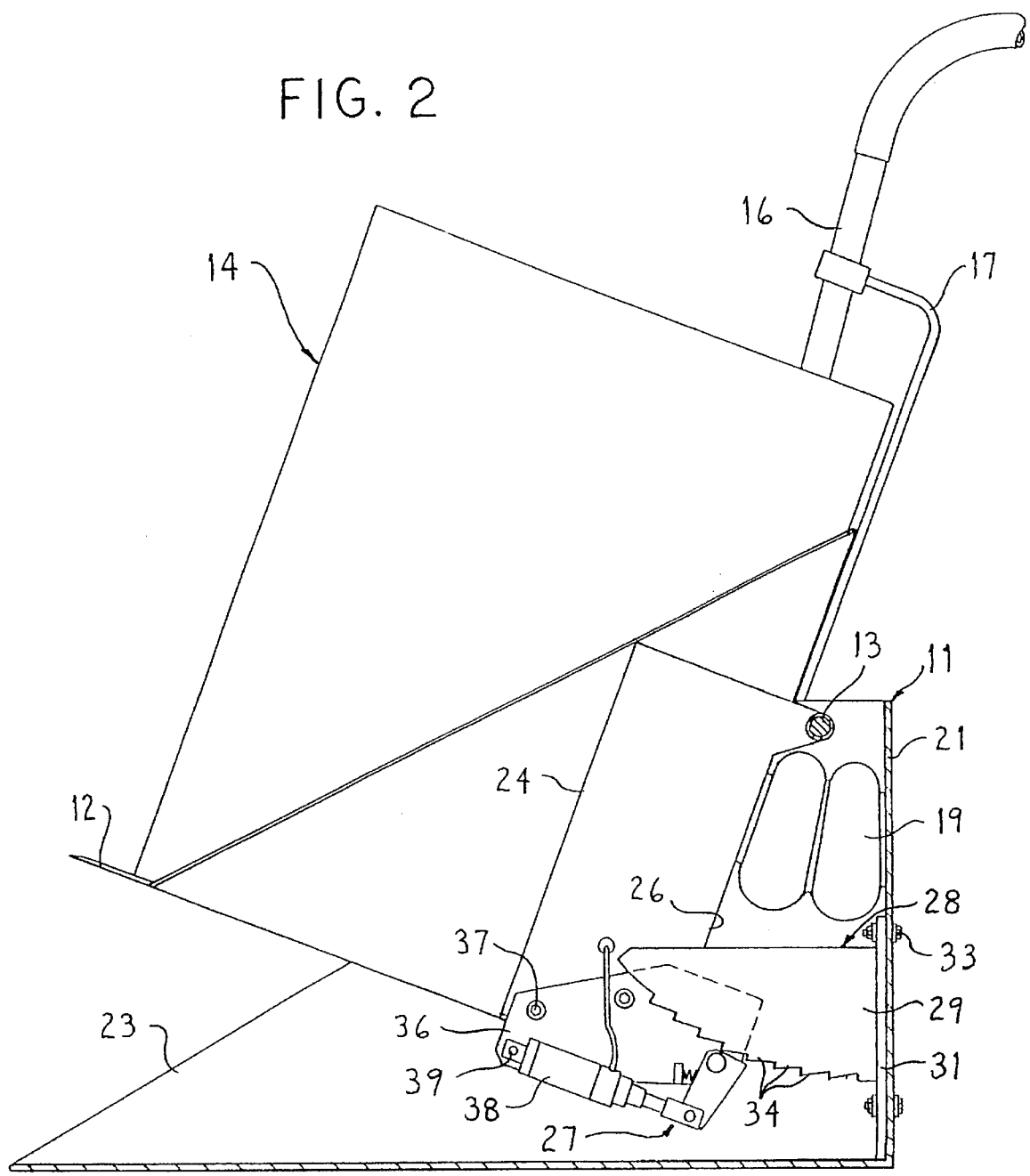
FIG. 2 is a side elevational view of the tipping device and inventive tilter catch mechanism.
Figure 3:
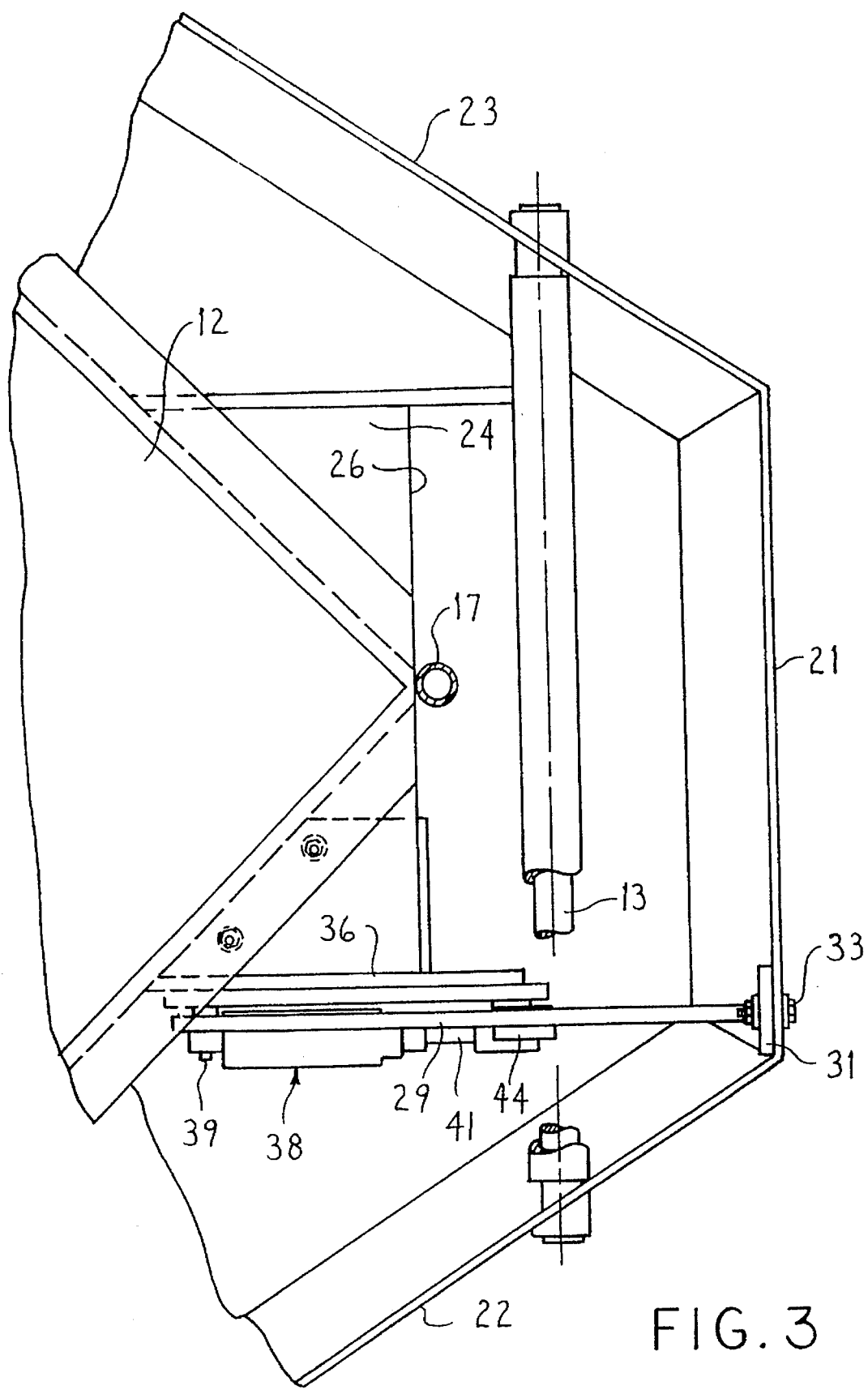
FIG. 3 is a top view of a fragment of the tipping device with portions of the structure being removed to provide an unobstructed top view of the tilter catch mechanism.

The tipping device 10 includes an inflatable bladder 19 oriented between the frame 11 and the tiltable platform 12. More specifically, the frame includes a generally U-shaped frame member consisting of a bight portion 21 and two diverging legs 22 and 23 extending away from the bight portion. The axle 13 is connected to and extends between the legs 22 and 23 as shown in FIG. 1. The tiltable platform includes a projection 24 fastened thereto having a surface 26 which opposes a surface 25 on the bight portion 21 of the frame 11. The bladder 19 is oriented between the surface 25 on the frame 21 and the surface 26 on the projection 24 as illustrated in FIG. 2. In this particular embodiment, the bladder 19 is oriented beneath the axle 13. Thus, as the bladder 19 is inflated and deflated, the tiltable platform 12 will be pivoted about the axle 13.

A tilter catch mechanism 27 is oriented also between the bight portion 21 of the frame 11 and the tiltable platform 12, here the projection 24. A generally T-shaped toothed ratchet gear 30 is provided and has a stem part 29 and a crosswise extending part 31 fastened to the stem part 29. The crosswise extending part 31 has a plurality of holes 32 therethrough allowing a fastener 33 to be received therein so as to facilitate securement of the crosswise part 31 to the surface 25 of the bight portion 21 of the frame 11. The stem part 29 extends perpendicularly away from the crosswise part 31 and has along its lower edge an arcuate array of teeth 34. In this particular embodiment, the centerpoint for the arc is the central axis for the shaft 13.

The tilter catch mechanism 27 also includes a bracket 36 secured to the projection 24 by fasteners 37. A pneumatically operated cylinder 38 is secured to the bracket 36 by a fastener 39. The pneumatic cylinder 38 includes a cylinder housing having a fixed together piston and piston rod 41 slidably oriented therein, which rod and piston are adapted to move under the force of air pressure applied to a chamber 42 against the urging of a return spring 43 to retract the piston rod into the cylinder housing.

The bracket 36 also has a pawl 44 pivotally secured thereto and for movement about a pivot axle 46. The pivot axle is secured to the reciprocal rod 41 of the pneumatic cylinder 38 by a fastener 47. The pawl 44 has an edge 48 thereon adapted to move into engagement with a selected one of the teeth 34 on the toothed ratchet gear 30. A spring 49 is oriented between the pawl 44 and an abutment 50 on the bracket 36 so that the pawl 44 will be continually urged with its edge 48 toward engagement with the teeth 34 on the toothed ratchet gear 30. The spring 49 will yield as the edge moves over each tooth. A retraction of the piston and rod 41 into the cylinder housing (a movement leftwardly in FIG. 4) will pivot the edge 48 completely away from the teeth 34.

Figure 4:
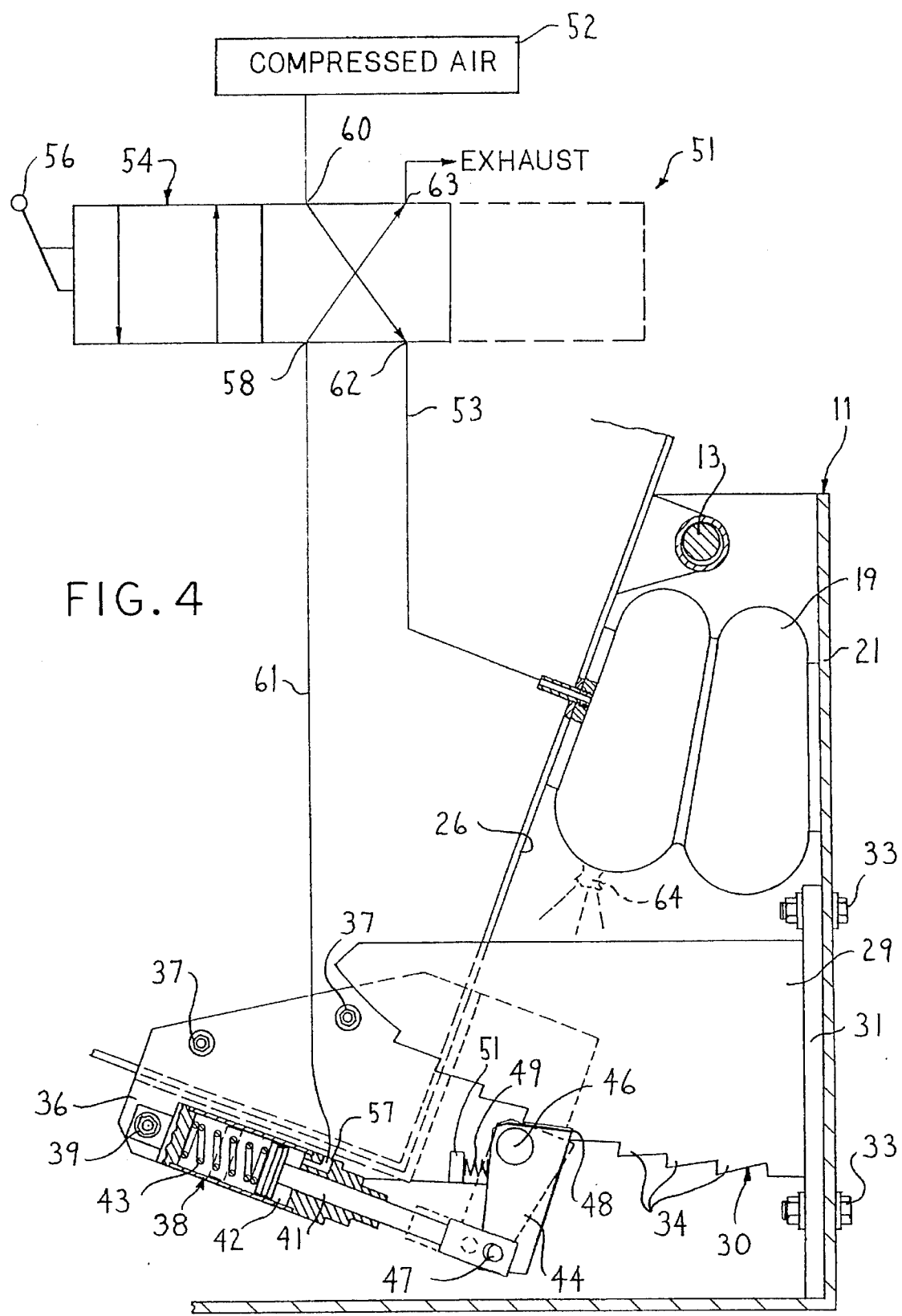
FIG. 4 is a fragmentary view of FIG. 2 with an associated pneumatic circuit operating the tilter catch mechanism.

FIG. 4 illustrates a pneumatic control device 51 for controlling the flow of pressurized gas from a pressurized gas supply 52 to and from the bladder 19 through ports 60 and 62 on the valve 54 and piping 53. The pneumatic control device 51 includes a two position valve 54 manually activated by an appropriate handle 56. The valve 54 in the position illustrated in FIG. 4 will cause an inflation of the bladder 19 and a pivoting of the tiltable platform to the illustrated position inclined to the horizontal. A port 57 on the pneumatic cylinder 38 is connected to an exhaust port 63 allowing the spring 43 to urge the piston and rod rightwardly to an extended position allowing the spring 49 to urge the edge 48 into engagement with the teeth 34. When it is desired to lower the tiltable platform back to its initial horizontally aligned position, the handle 56 is activated to shift the valve 54 to the right so that the port 57 on the pneumatic cylinder 38 will be connected to a port 58 on the valve 54 to supply pressurized gas through piping 61 to the port 57 on the pneumatic cylinder 38 to urge the piston and rod 41 to a leftmost position illustrated in FIG. 4 and against the urging of the spring 43. As a result, the pawl 44 will be pivoted away from the teeth 34 at the same time that the bladder 19 will be deflated caused by the port 62 being connected to the port 63 to facilitate an exhausting of the gas contained within the bladder 19.

In the event of a rupture of the bladder 19 as indicated by the broken line construction 64 in FIG. 4 when the platform is in a tilted position, there will be a sudden drop in the gas pressure in the bladder 19 as well as the piping 53. Thus, the edge 48 will engage the first available tooth 34 on the toothed ratchet gear 30 to hold the tiltable platform in a fixed position until the rupture can be repaired.

The toothed ratchet gear 30, the pneumatic cylinder 38 and pawl 44 as well as the bracket 36 and various fastening member 33, 37 and 39 can be assembled into a package and shipped to owners of tilting devices of the above-mentioned type so that they can have the tilter catch mechanism become a part of their respective tilter units already in operation. Thus, the heretofore unsafe tilting mechanisms can be rendered safe by the incorporation of the tilter catch mechanism as described above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A tilter catch mechanism for a tipping device, said tipping device having a frame, a flat tiltable platform tiltably supported on said frame between a first horizontally aligned position and a second position inclined to the horizontal and a first pneumatic driven means for effecting a driving tilting movement of said platform between said first and second positions, said tilter catch mechanism comprising:

a ratchet gearing device interposed between said frame and said tiltable platform, said ratchet gearing device including a toothed ratchet gear attached to at least one of said frame and said tiltable platform and a pivotal pawl pivotally supported on the other of said at least one of said frame and said tiltable platform, said pawl being pivotal between a first position engaging one of a plurality of teeth of said toothed ratchet gear and a second position spaced from said toothed ratchet gear and teeth thereon;

resilient means for continually urging an edge on said pawl toward said first position;

a pneumatic control means for controlling a flow of pressurized gas from a pressurized gas supply to and from said first pneumatic driven means to cause said tiltable platform to be moved between said first and second positions, said pneumatic control means causing, when said tiltable platform is in the second position and there exist a tendency for said tiltable platform to be moved toward the first position without a change of state of said pneumatic control means, an engagement of said pawl with said one of a plurality of teeth on said toothed ratchet gear to thereby prevent said tiltable platform from moving further toward said first horizontally aligned position.

2. The tilter catch mechanism according to claim 1, wherein said pneumatic control means includes a second pneumatic driven means.

3. The tilter catch mechanism according to claim 2, wherein said tilter catch mechanism is a retrofit kit adapted to be retrofitted into tipping devices already in operation, said toothed ratchet gear, said pawl, said second pneumatic driven means and bracketing therefor being packaged separately from said tipping device.

4. The tilter catch mechanism according to claim 2, wherein said pawl includes a bracket having means thereon for pivotally supporting said pawl and for facilitating a mounting of said bracket to said tiltable platform, said second pneumatic driven means being mounted on said bracket and having a reciprocal member attached to the pawl for effecting a pivoting of said pawl in response to reciprocation of said reciprocal member.

5. The tilter catch mechanism according to claim 4, wherein said toothed ratchet gear and said bracket are separately mounted to said frame and said tiltable platform and aligned with each other to facilitate operative engagement between said pawl and a said tooth on said toothed ratchet gear when said pawl is in said first position thereof.

6. The tilter catch mechanism according to claim 1, wherein said toothed ratchet gear is a T-shaped piece having a stem part and a crosswise extending part fixed to the stem part, said stem part having an arcuately curved edge and said plurality of teeth spaced along the length of said arcuately curved edge, said crosswise part having a plurality of holes extending therethrough to facilitate mounting to said frame.

* * * * *